United States Patent

Hatano et al.

[15] 3,705,298

[45] Dec. 5, 1972

[54] CONVERSION SYSTEM FOR USE IN ELECTRONIC CALCULATORS

[72] Inventors: Isao Hatano; Akira Nagano; Kenzi Yosimoto, all of Kyoto, Japan

[73] Assignee: Omron Tateisi Electronics Co., Kyoto-shi, Japan

[22] Filed: Dec. 17, 1970

[21] Appl. No.: 99,090

[30] Foreign Application Priority Data

Dec. 17, 1969 Japan ..............................44/101959

[52] U.S. Cl. ....................235/154, 235/155, 235/170

[51] Int. Cl. ..............................................G06f 5/02

[58] Field of Search..............235/154, 155, 170, 169; 340/347 DD

[56] References Cited

UNITED STATES PATENTS

| | | | |
|---|---|---|---|
| 2,886,241 | 5/1959 | Spaulding et al. | 235/154 |
| 2,860,327 | 11/1958 | Campbell | 235/155 |
| 3,214,576 | 10/1965 | Propster, Jr. | 235/170 X |

*Primary Examiner*—Maynard R. Wilbur
*Assistant Examiner*—Leo H. Boudreau
*Attorney*—Craig & Antonelli

[57] ABSTRACT

A conversion system for an electronic calculator employs a shift register and a full adder circuit to convert binary digit signals for decimal display purposes. The shift register and full adder include appropriate gating and delay-feedback circuitry for serial conversion, column shift, and read-out.

9 Claims, 7 Drawing Figures

INVENTORS
ISAO HATANO, AKIRA NAGANO & KENZI YOSIMOTO
BY Craig, Antonelli, Stewart & Hill
ATTORNEYS

INVENTORS
ISAO HATANO, AKIRA NAGANO & KENZI YOSIMOTO
BY
ATTORNEYS

FIG. 5(a)

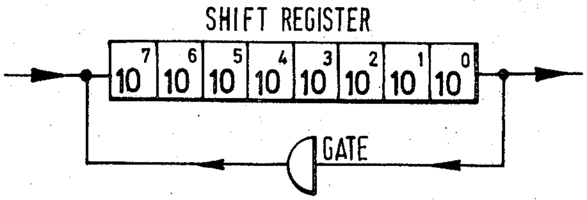

FIG. 5(b)

| | TIMING \ STAGE | $10^7$ | $10^6$ | $10^5$ | $10^4$ | $10^3$ | $10^2$ | $10^1$ | $10^0$ |
|---|---|---|---|---|---|---|---|---|---|
| | T1 | $\beta_8$ | $\beta_7$ | $\beta_6$ | $\beta_5$ | $\beta_4$ | $\beta_2$ | $\beta_2$ | $\beta_1$ |
| | T2 | $\beta_1$ | $\beta_8$ | $\beta_7$ | $\beta_6$ | $\beta_5$ | $\beta_4$ | $\beta_3$ | $\beta_2$ |
| | T3 | $\beta_2$ | $\beta_1$ | $\beta_8$ | $\beta_7$ | $\beta_6$ | $\beta_5$ | $\beta_4$ | $\beta_3$ |
| τ | T4 | ¦ | ¦ | ¦ | ¦ | ¦ | ¦ | ¦ | ¦ |
| | T4 | ¦ | ¦ | ¦ | ¦ | ¦ | ¦ | ¦ | ¦ |
| | T6 | ¦ | ¦ | ¦ | ¦ | ¦ | ¦ | ¦ | ¦ |
| | T7 | $\beta_6$ | $\beta_5$ | $\beta_4$ | $\beta_3$ | $\beta_2$ | $\beta_1$ | $\beta_8$ | $\beta_7$ |
| | T8 | $\beta_7$ | $\beta_6$ | $\beta_5$ | $\beta_4$ | $\beta_3$ | $\beta_2$ | $\beta_1$ | $\beta_8$ |
| τ | T1 | $\beta_8$ | $\beta_7$ | $\beta_6$ | $\beta_5$ | $\beta_4$ | $\beta_3$ | $\beta_2$ | $\beta_1$ |

INVENTORS
ISAO HATANO, AKIRA NAGANO & KENZI YOSIMOTO
BY Craig, Antonelli, Stewart & Hill
ATTORNEYS

CONVERSION SYSTEM FOR USE IN ELECTRONIC CALCULATORS

The present invention relates to electronic calculating machines and, more particularly, to a conversion system of a nature generally applicable to such calculating machines and by which a certain combination of four binary digits representing a decimal number having a plurality of columns, that is, a decimal number of not less than (10), can be converted into a corresponding number of combinations of four binary digits, each of these combinations representing a decimal number of less than (10).

It is well known that, when the decimal number (5) is to be added to the decimal number (6) with the use of an electronic calculator, a binary code 0101 representative of the number (5) is added to a binary code 0110 representative of the number (6) in the arithmetic circuit of the calculator, to give the sum of 1011 which is the binary code of the decimal number (11).

However, the electronic calculators generally available are provided with a digital display device including a plurality of read-out means, for example, read-out tubes each capable of selectively illuminating one of the decimal numbers zero through nine, so that a predetermined combination of decimal digits can be illuminated to correspond with a given binary code. If the binary code 1011 is merely impressed on the digital display device, the corresponding decimal digits (11) will not be displayed. In order to display the decimal digits (11) which represent the sum of (5 + 6), it is necessary to convert the binary code 1011 into a pair of binary combinations 0001 and 0001, to cause each of the read-out tubes to illuminate the digit (1).

Accordingly, the object of the present invention is to provide a converting system capable of performing this operation. The invention is more specifically defined in the appended claims.

Other objects and features of the invention will become apparent from the following description taken by way of example with reference to the accompanying drawings, in which.

Figure 4A:
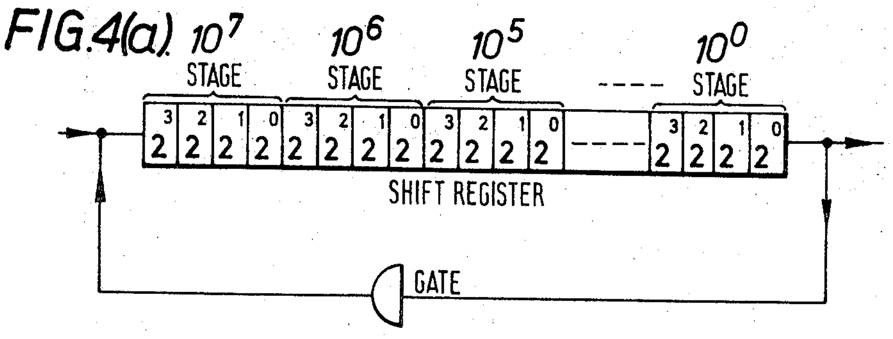
Figure 4B:
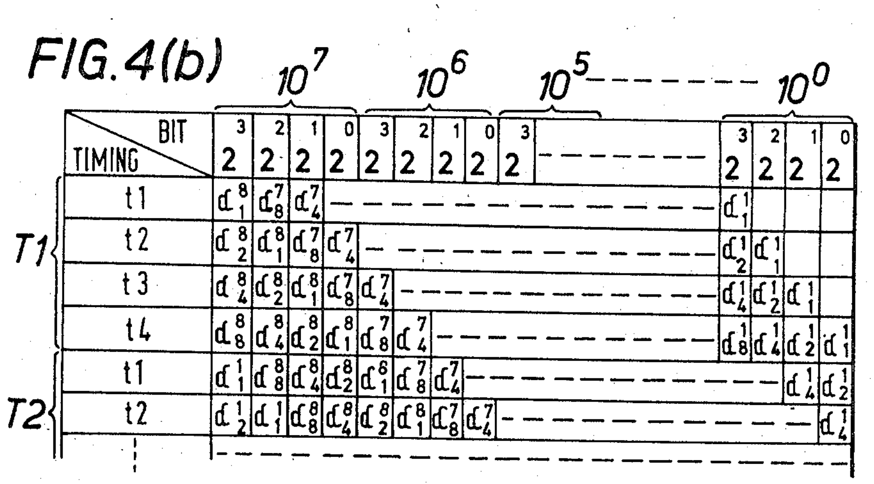

FIG. 4 shows an arrangement of bits in a shift register in the preferred embodiment of the present invention, wherein FIG. 4(*a*) is a schematic diagram showing each stage composed of four bits and FIG. 4(*b*) is a schematic diagram showing a manner in which each bit is shifted to the right; and FIG. 5 shows a stage arrangement of the shift register of the preferred embodiment, wherein FIG. 5(*a*) is a schematic diagram showing the shift register composed of 8 stages and FIG. 5(*b*) is a schematic diagram showing a manner in which each decimal digit is shifted from one stage to another.

Figure 1:
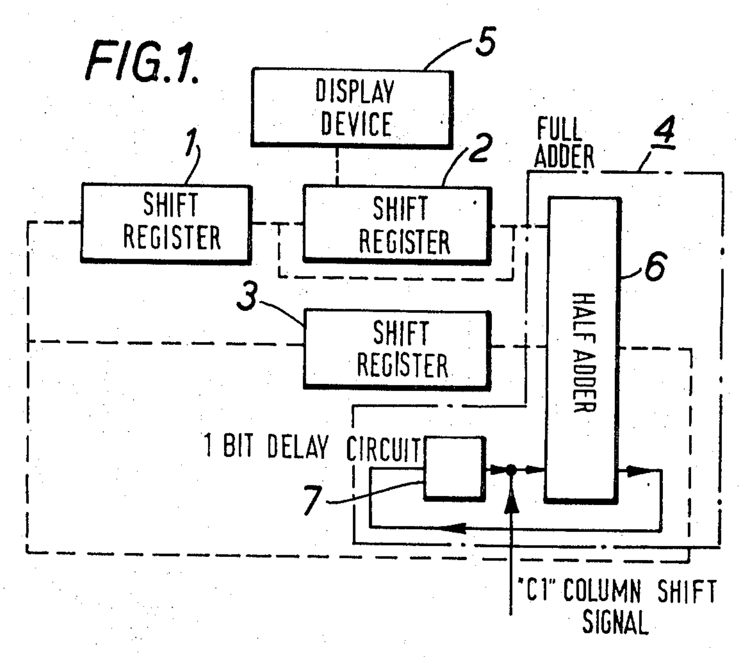
FIG. 1 is a schematic block diagram of the circuitry employed in an electronic calculator.

Referring now to FIG. 1, the serial arithmetic circuitry generally includes three shift registers 1, 2 and 3, a full adder 4 and a display device 5. Each of these shift registers 1, 2 and 3 and the full adder 4 is of the serial type. The full adder 4 may be of a known type, including a half adder 6 and a one bit delay circuit 7, the output of which half adder is the sum of the outputs of the registers 2 and 3. This output of the half adder 6 is applied to the register 2 through the register 1 and is then caused to circulate in the register 2. Various gate means are connected among the components; such as between the display device, the shift registers, the half adder and other components. However, these gate means are omitted from the drawings for the purpose of simplification of the description.

Figure 3:
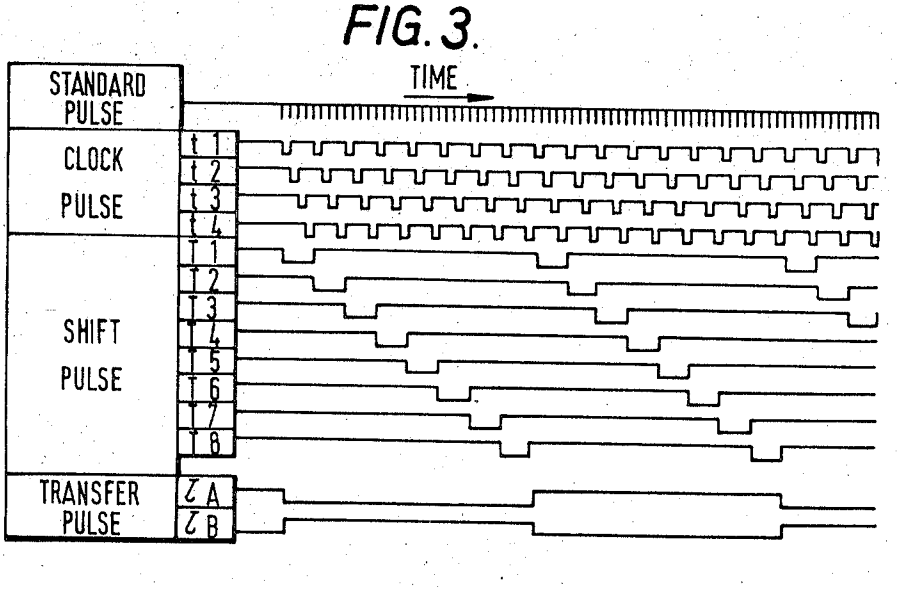
FIG. 3 is a schematic diagram of various pulses employed in the present circuits showing their timing with respect to one another.

The arithmetic circuit so constructed can be operated by such pulse trains as clock pulses $t1$, $t2$, $t3$ and $t4$, shift pulses T1, T2 . . . T7 and T8 and transfer pulses $\tau$A and $\tau$B, particularly as shown in FIG. 3. In the example shown, one decimal digit $\beta$ can be expressed by various combinations of binary digits $\alpha_8$, $\alpha_4$, $\alpha_2$ and $\alpha 1$ wherein numerals of the suffix 8, 4, 2 and 1 represent the $2^3$, $2^2$, $2^1$ and $2^0$ positions. If the number of stages of the shift register is assumed to be eight, 32 bits are provided for, the number having eight decimal digits $\beta_8$, $\beta_7$ . . . $\beta_2$ and $\beta_1$ in sequence, wherein numerals 8 to 1 represent the $10^7$, $10^6$ . . . $10^1$ and $10^0$ columns, respectively. In this example, four clock pulses $t1$, $t2$, $t3$ and $t4$ are employed to shift each bit of the register to the right. For shifting one decimal digit $\beta$ from one stage to another, shift pulses T1 to T8 are employed. The whole contents of any one of the shift registers can be transferred during the duration of a single transfer pulse $\tau$A or $\tau$B.

The four binary digits $\alpha_8$, $\alpha_4$, $\alpha_2$ and $\alpha_1$ representative of each decimal digit $\alpha$ that has been stored in the register 2 are successively applied to the input of the display device 5 in a cyclic manner. This display device 5 includes a plurality of read-out tubes, each capable of selectively illuminating the figure of one of the decimal digits zero through nine, in response to pulse trains representative of the binary digits $\alpha_8$, $\alpha_4$, $\alpha_2$ and $\alpha_1$ applied thereto. Accordingly, for the reason hereinbefore described, the sum of numbers each expressed by a combination of four bits circulated in the register 2 should be less than (10). By way of example, in the case where the decimal number (6) is stored in the register 2 while the decimal number (5) is stored in the register 3, a train of pulses representative of the binary digits 1011, representative of the decimal sum of the above two numbers, will be generated by the adder 4. However, even when the train of pulses thus generated is merely applied to the display device 5 through the register 2, the read-out tube does not show the figure (11).

In order to cause the display device 5 to show the figure (11) which is the sum of (5 + 6), the binary combinations 0000, 1011 circulated in the register 2 should be converted to give a pair of binary combinations 0001, 0001 whereby the left-hand binary combination represents the most significant digit of the decimal number (11) while the right-hand combination represents the least significant digit thereof. A system for performing such conversion is particularly shown in FIG. 2.

Figure 2:
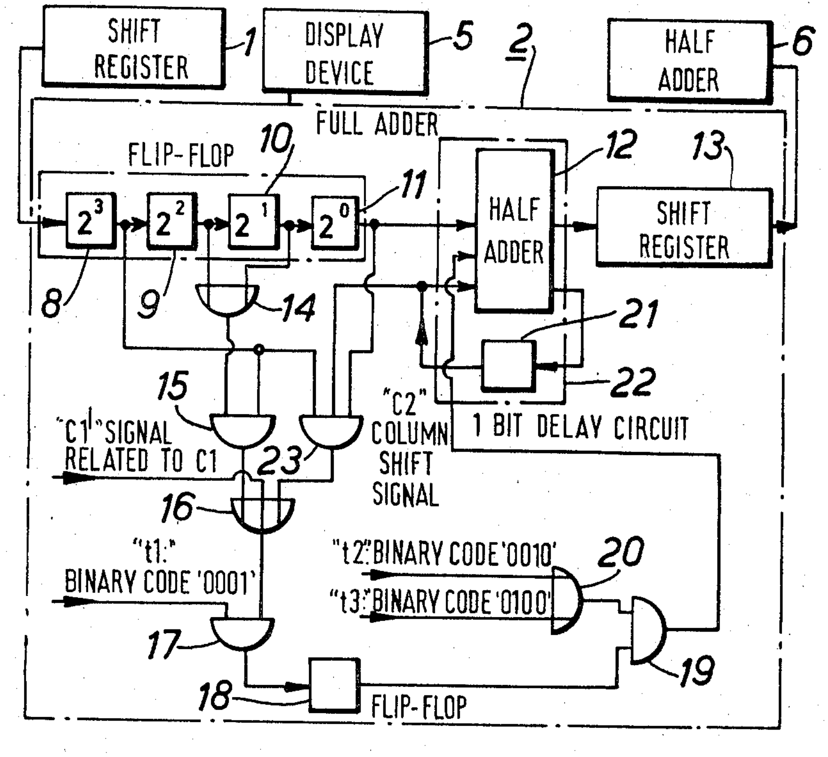
FIG. 2 is a portion of the circuitry of FIG. 1 showing a converting circuit according to a preferred form of the present invention.

Referring now to FIG. 2, the system shown is a detailed circuit of the register 2 of FIG. 1 and includes flip-flops 8, 9, 10 and 11, the combination of these flip-flops corresponding to one binary digit. These flip-flops 8 to 11 are connected in series with each other and in series with a half adder 12. The maximum number of decimal digits that can be stored by the register 2 is substantially equal to the sum of the number of decimal digits to be stored by the flip-flops 8 to 11 and the maximum number of decimal digits to be stored by the register 13. These flip-flops 8 to 11 are adapted to store the most significant digit of the decimal number to be stored by the register 2.

Respective outputs of the flip-flops 9 and 10 are applied to one input terminal of a first AND gate 15 through a first OR gate 14, while the output of the flip-flop 8 is applied to the other input terminal of the gate 15. The output of the gate 15 is impressed on one input terminal of a second AND gate 17 through a second OR gate 16, while the other input terminal of the gate 17 receives a signal *t1* generated by a clock pulse generator (not shown).

As shown in FIG. 3, this signal *t1* is the first one of the clock pulses *t1*, *t2*, *t3* and *t4* which are respectively adapted to shift binary digits in the $2^0$, $2^1$, $2^2$ and $2^3$ positions. In other words, while the contents stored in the arithmetic circuit are circulated by these clock pulses *t1* to *t4*, each decimal digit is shifted to the right and finally read-out by the display device.

The output of the second AND gate 17 can be stored in a flip-flop 18, the output of which is received by a third AND gate 19. This AND gate 19 also receives the output of a third OR gate 20 to which the signals *t2* and *t3* are individually applied. Accordingly, since the third OR gate 20 can generate a signal when the clock pulses t2 and t3 are individually applied thereto, a signal representative of the binary combination 0110 is transmitted from the third gate 19 to the input of the half adder 12 to which the column shift signal C2 is also applied from a one bit delay circuit 21, whereby the combination of the half adder 12 with the one bit delay circuit 21 acts as a full adder 22.

In this arrangement, when a certain decimal number composed, for example, of two digits, is to be applied to the input of the flip-flop 8, a pulse train representative of binary digits $\alpha_8^2$, $\alpha_4^2$, $\alpha_2^2$ and $\alpha_1^2$ which correspond to the most significant digit of the decimal number can be respectively applied to the flip-flops 8 to 11 by the clock pulses *t1* to *t4*, in the sequence $\alpha_1^2$, $\alpha_2^2$, $\alpha_4^2$ and $\alpha_8^2$ during one cycle of operation, and another pulse train representative of binary digits $\alpha_8^1$, $\alpha_4^1$, $\alpha_2^1$ and $\alpha_1^1$ which correspond to the next most significant digit, that is, the least significant digit in this example, can be respectively applied to the flip-flops 8 to 11 by the clock pulses *t1* to *t4*, in the sequence $\alpha_1^1$, $\alpha_2^1$, $\alpha_4^1$ and $\alpha_8^1$ during the following cycle of operation, while the binary digits $\alpha_8^2$, $\alpha_4^2$, $\alpha_2^2$ and $\alpha_1^2$ have been transferred to the register 13 through the half adder 12, as shown in FIG. 4.

FIG. 4(*a*) shows the form taken by each of the shift registers, these being divided into eight stages, identified as the $10^7$, $10^6$, $10^5$ down to $10^0$ stage. Each stage contains four binary digit positions $2^3$, $2^2$, $2^1$ and $2^0$. The gate shown symbolizes the recirculation procedure.

FIG. 4(*b*) demonstrates how each bit is shifted to the right and recirculated by successive clock pulses *t1* to *t4* of successive shift pulses T1, T2 etc. For example, the bit $\alpha_1^8$ in position $2^3$ of stage $10^7$ at the first time *t1* is moved by the next pulse *t2* to the next position to the right, i.e. into position $2^2$ of stage $10^7$. Similarly all the other bits are simultaneously moved to the right, the bit in position $2^0$ of stage $10^0$ (i.e. bit $\alpha_1^1$ at pulse *t4*, *T1*) being recirculated to position $2^3$ of stage $10^7$ at the next pulse, i.e. *t1*, T2, and so on.

FIG. 5(*a*) shows the stage arrangement only of each shift register, again with the gate symbolizing the recirculation. FIG. 5(*b*) shows the progress of the information around the register for each shift pulse T1 to T12 of a typical transfer pulse period $\tau$, the information here being represented by the decimal digits $\beta_8$ to $\beta_1$.

However, in this example, the binary digits corresponding to one decimal digit have been stored in the flip-flops 8 to 11 prior to the generation of the clock pulse *t1*. Accordingly, if the binary digit $\alpha_2$ in the $2^1$ position is 1 and/or the binary digit $\alpha_4$ in the $2^2$ position is 1, the first OR gate 14 will be turned on to generate a signal representative of 1 to the first AND gate 15. This AND gate 15 will in turn generate a signal representative of 1 only when the binary digit $\alpha_8$ in the $2^3$ position is 1. Accordingly, the output of the AND gate 17, when the clock pulse t1 is applied thereto, will be 1. In other words, when the binary digits stored in the flip-flops 8 to 11 is 1010 or more than 1010, i.e., not less than the decimal number (10), the second AND gate 17 generates an output representative of 1.

By way of example, assume now that the binary digits 1101 corresponding to the decimal number (13) are stored in the flip-flops 8 to 11. Respective outputs of the flip-flops 10 and 9 are 0 and 1 so that the OR gate 14 feeds a signal representative of 1 to the first AND gate 15. Since the output of the flip-flop 8 is also 1, this AND gate 15 feeds a signal representative of 1 to the second AND gate 17. When this signal 1 is thus applied to the gate 17 and the clock pulse t1 is simultaneously applied thereto, the gate 17 generates a signal representative of 1, to bring the flip-flop 18 into the set position, so that the signal 1 is applied through the flip-flop 18 to the corresponding input terminal of the third AND gate 19. Since the other input terminal of this gate 19 receives the output of the third OR gate 20 to which the clock pulses *t2* and *t3* are respectively applied, the output of the gate 19 will be a pulse train representative of:

0110 (*a*)

This pulse train is impressed on the full adder 22 as the following four bits (*b*) of the flip-flops 8 to 11 are sequentially applied to the full adder 22:

1101 (*b*)

These binary digits (a) and (b) are added by the full adder 22 to give the following sum:

*
10011 (c)

* The leftmost digit as marked with an asterisk, that is, (1), of the binary sum (c) is used as a column shift signal C2, while the remaining digits 0011 are transferred to the register 13. Since the column shift signal C2 is provided, the following binary combination for the $10^1$ position will be formed into 0001 by the column shift signal C2. From the foregoing description, it will be understood that the binary combination representing the decimal number (13) within a four-binary frame is converted into 0011 representative of the least significant digit (3) while the following binary combination is formed into 0001 representative of the most